United States Patent [19]

Beine et al.

[11] 4,032,397

[45] June 28, 1977

[54] BURST SHIELD CONTAINMENT FOR NUCLEAR REACTOR AND METHOD OF OPERATING SAME

[75] Inventors: Burkhard Beine, Tonisvorst; Franz Schilling, Kempen, both of Germany

[73] Assignee: Siempelkamp Giesserel AG, Krefeld, Germany

[22] Filed: Apr. 18, 1975

[21] Appl. No.: 569,157

[30] Foreign Application Priority Data

Apr. 19, 1974 Germany ............... 2419033

[52] U.S. Cl. .................... 176/38; 176/87
[51] Int. Cl.² ............... G21C 11/00; G21C 9/00
[58] Field of Search ............ 176/37, 38, 87, 40

[56] References Cited

UNITED STATES PATENTS

| 3,275,523 | 9/1966 | Campbell, Jr. et al. | 176/44 |
| 3,578,564 | 5/1971 | Fletcher | 176/87 |
| 3,711,371 | 1/1973 | Cahill, Jr. | 176/50 |
| 3,775,251 | 11/1973 | Schabert | 176/87 |
| 3,850,795 | 11/1974 | Thome | 176/50 |
| 3,868,302 | 2/1975 | Singleton | 176/87 |
| 3,881,288 | 5/1975 | Fay | 176/87 X |
| 3,898,126 | 5/1975 | Dorner et al. | 176/87 |

FOREIGN PATENTS OR APPLICATIONS 7,206,476  2/1967  Japan ............... 176/38

*Primary Examiner*—Verlin R. Pendegrass
*Assistant Examiner*—Ralph Palo
*Attorney, Agent, or Firm*—Karl F. Ross; Herbert Dubno

[57] ABSTRACT

A pressurized nuclear-reactor core is surrounded by an inspection cavity, and a burst shield with a side wall, a bottom and a cover. The inspection cavity is filled with a removable zero-path filling agent which fills the total space between core and shield so as to leave no free first-path. The filling agent is an incompressible fluent medium of either an incompressible fluid (i.e. a liquid) or a fine grained more or less incompressible, loose flowable material. Means is provided to prevent uncontrolled escape of the fluid medium.

8 Claims, 4 Drawing Figures

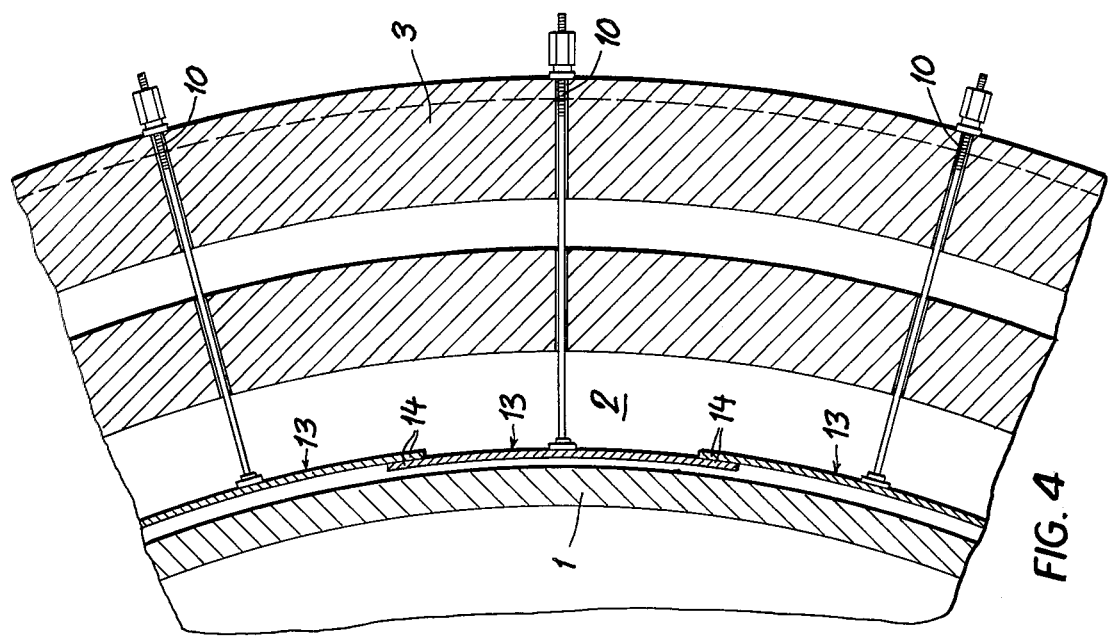
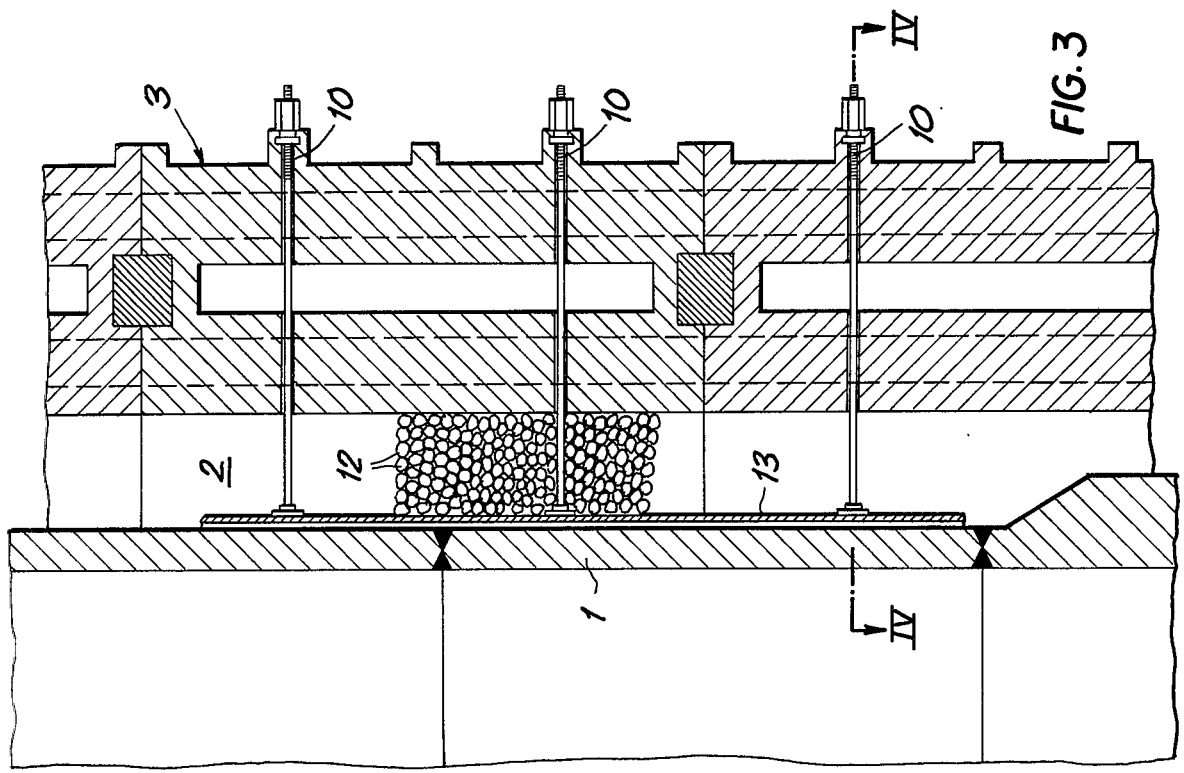

BURST SHIELD CONTAINMENT FOR NUCLEAR REACTOR AND METHOD OF OPERATING SAME

CROSS-REFERENCE TO RELATED APPLICATION

This application is related to copending application Ser. No. 441,491 filed 11 Feb., 1974.

FIELD OF INVENTION

The present invention relates to a pressurized nuclear-reactor core, with a burst shield spaced from the core. More particularly this invention concerns the use of an incompressible fluent filling agent in the inspection cavity surrounding a pressurized nuclear-reactor core, and devices for housing, pouring and removing same, the filling agent constituting a zero-free-path medium between core and shield.

BACKGROUND OF THE INVENTION

It is known to make pressurized-water, boiling water, and pressurized-gas nuclear reactors with a shield surrounding the pressurized core, in order to protect the surroundings should the core burst. As a rule it has been found necessary to provide an inspection cavity between the pressurized core and the burst shield. This inspection cavity is used for a removable filling in order to reduce the burst way to zero. With the burst shield of the cited application, for example, the zero-path filling of the inspection cavity is comprised of cast-iron segments, which are put in place and lifted out by removing the burst shield cover.

Although this has given satisfactory results, it requires special fitting work and placing and lifting of the cast-iron segments is a rather considerable expenditure. In addition accurate computations of thermal expansion for dimensioning the cast-iron segments are necessary in order to assure the reduction of the free burst path to zero or practically to zero. Moreover it is important that the pressurized nuclear reactor core does not receive uncontrolled stresses due to pressures caused by thermal expansion of the cast-iron segments.

OBJECTS OF THE INVENTION

It is therefore an object of the present invention to provide an improved removable zero-way filling agent for the inspection cavity of a burst shield containment for a pressurized nuclear core.

Another object is to provide an improved containment for a nuclear reactor whereby the aforementioned disadvantages are avoided.

Still another object is to provide an improved method of operating a nuclear reactor.

SUMMARY OF THE INVENTION

These objects are obtained according to the present invention with a removable, incompressible, fluent medium, filled into the inspection cavity between a nuclear reactor core and a surrounding burst shield with connected bottom and cover. According to the invention the incompressible fluent medium is an incompressible fluid (i.e. a liquid) or a fine grained loose material — more or less incompressible — flowing like a liquid.

In accordance with the invention, therefore, the incompressible fluid medium is a liquid, preferably water, or a fine-grained loose material — more or less incompressible — flowing like a liquid. In the frame of the invention "loose material" is defined as any kind of material of a suitable solidity, e.g. sand, steelgrit and the like. The fineness of the grain can advantageously range between 0.1 and 5 mm, as long as the loose material remains fluid.

Because of the internal friction of the loose material — if used — it is filled into the inspection cavity of a burst shield containment when the pressurized nuclear-reactor core is in a cold state.

Thermal expansion caused by the operating temperature of the pressurized nuclear-reactor core, can compress the loose material and cause more or less uncontrollable stresses in the pressurized nuclear-reactor core, which is not permissible for safety reasons.

This disturbing effect when filling the inspection cavity with loose material is eliminated by the invention in providing adjustable aprons between the core or the shield and the filling mass. While the pressurized nuclear-reactor core is being brought to its operating temperature, in order not to touch same, the aprons are moved away.

The loose material is filled into the inspection cavity while the nuclear reactor core is yet in a relatively cold state, between the aprons and the core. When the nuclear-reactor core reaches its operating temperature, the aprons are moved back to touch the outer surface of the reactor core in order to set the free-burst path to practically zero. In doing so, the loose material because of its character, slides readily further down. More loose material is poured in from above.

A device is provided for the inspection cavity to receive the filling agent through an upper inlet, situated above the burst shield cover.

To be able to remove the zero-way filling agent from the inspection cavity a sealed (valved) outlet in the bottom of the inspection cavity is provided in order to drain the filling agent like a liquid. If space conditions do not permit this, a suction device operating from the cover of the burst containment removes the fluid medium from the inspection cavity.

In accordance with yet another feature of this invention the inspection cavity is sealed in order to prevent the uncontrolled escape of the incompressible fluid medium. With liquid as a zero-path filler, a flexible sealing liner, preferably plastic or rubber, on the inside of the burst shield containment, is provided.

When a fine-grained loose material is used as a zero-way filler a sealing liner is of advantage but is not absolutely necessary. aprons aprons As previously described, the invention provides on the outside of the pressurized nuclear-reactor core metal plate aprons or preferably steel plate aprons. The distance of the apron from the burst shield is adjustable. The apron cover the entire height of the nuclear-reactor core. The aprons can be adjusted in different ways, but preferably bolts are attached to the aprons and supported in the burst shield in such a fashion as to be screwed both ways. The aprons can be combined to a vertical sheet-metal plate, e.g. by means of welding. They also can comprise overlapping individual sheet-metal plates.

A burst shield according to the present invention has the advantage that the zero-path filling lies always close on the outside of the nuclear reactor core and on the inside of the burst shield including the areas of cover and bottom. In case of catastrophy the incompressible fluid medium is able to transfer the pressure equally onto the entire burst shield area to prevent or reduce a reaction force, which normally has a destructive effect on reactor installations and foundations. The zero-path filling comprising an incompressible fluid medium is easy to insert and easy to remove. If a liquid is used, it can function for heating or cooling purposes. In using a liquid it is advisable to use a light under pressure.

BRIEF DESCRIPTION OF DRAWING

The above and other objects, features, and advantges of the present invention will become bore readily apparent from the following description, reference being made to the accompanying drawing in which

FIG. 3 is a detail of the core and burst shield of a nuclear reactor as indicated by circle III of FIG. 2.

FIG. 4 is a section taken along line IV—IV of FIG. 2 or FIG. 3.

SPECIFIC DESCRIPTION

Figure 1:
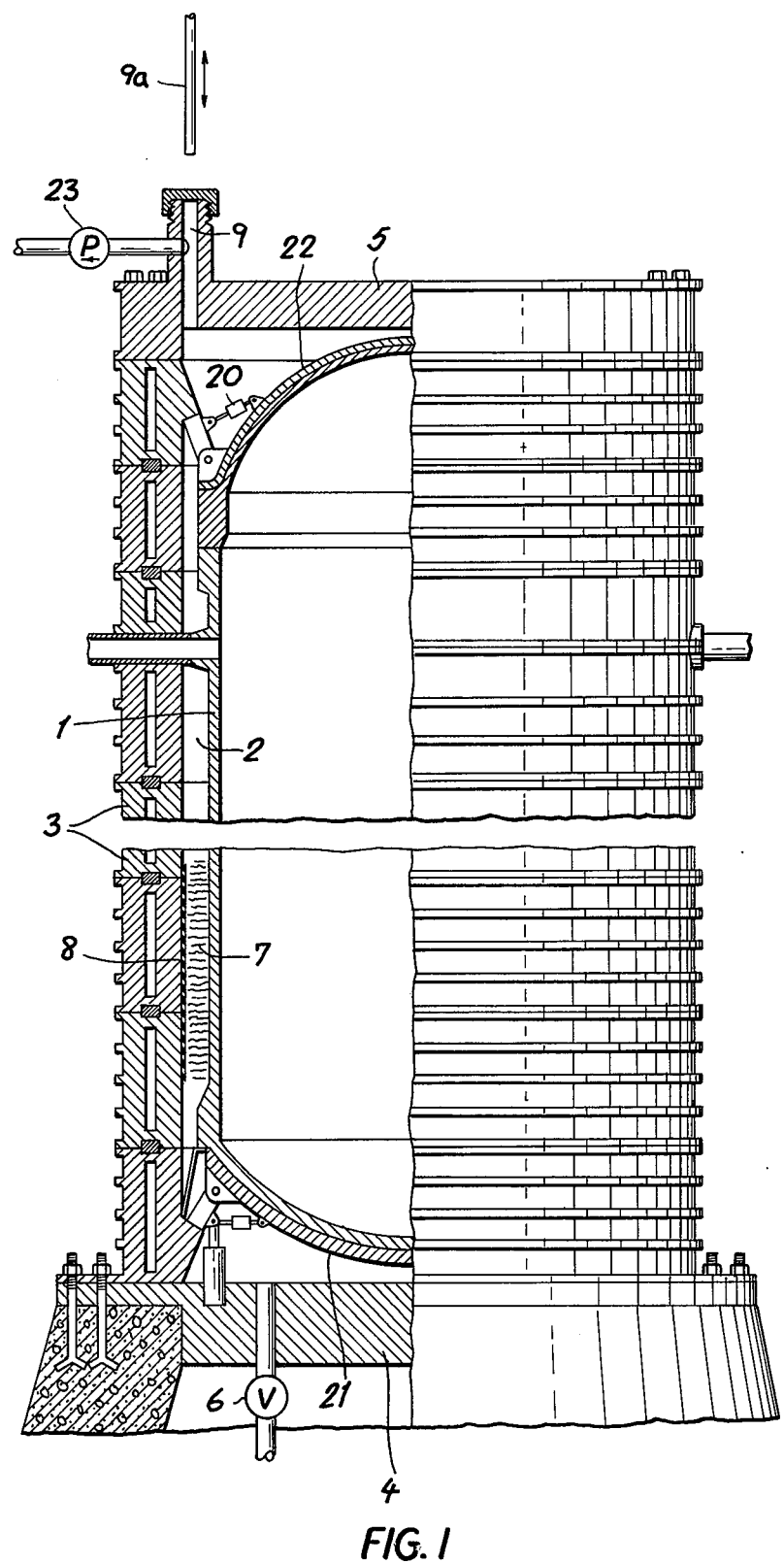
FIG. 1 is a diagrammatic vertical section through a burst shield and nuclear reactor core according to the present invention.

As shown in FIG. 1 a nuclear-reactor having a pressurized core 1 is surrounded by an inspection cavity 2 and a burst shield with side walls 3, base 4, cover 5, the zero-path liquid 7 and a rubber sealing liner 8.

Base 4 has a sealed outlet 6 for the liquid filling 7. In case space does not permit such an outlet, cover 5 has an opening 9 for receiving a rod of suction device 9a which reaches down into the space between burst shield and reactor core to empty the inspection cavity of the liquid 7. A hopper 15 can open into an inlet 11 on cover 5 for filling inspection cavity 2 (FIG. 2).

Figure 2:
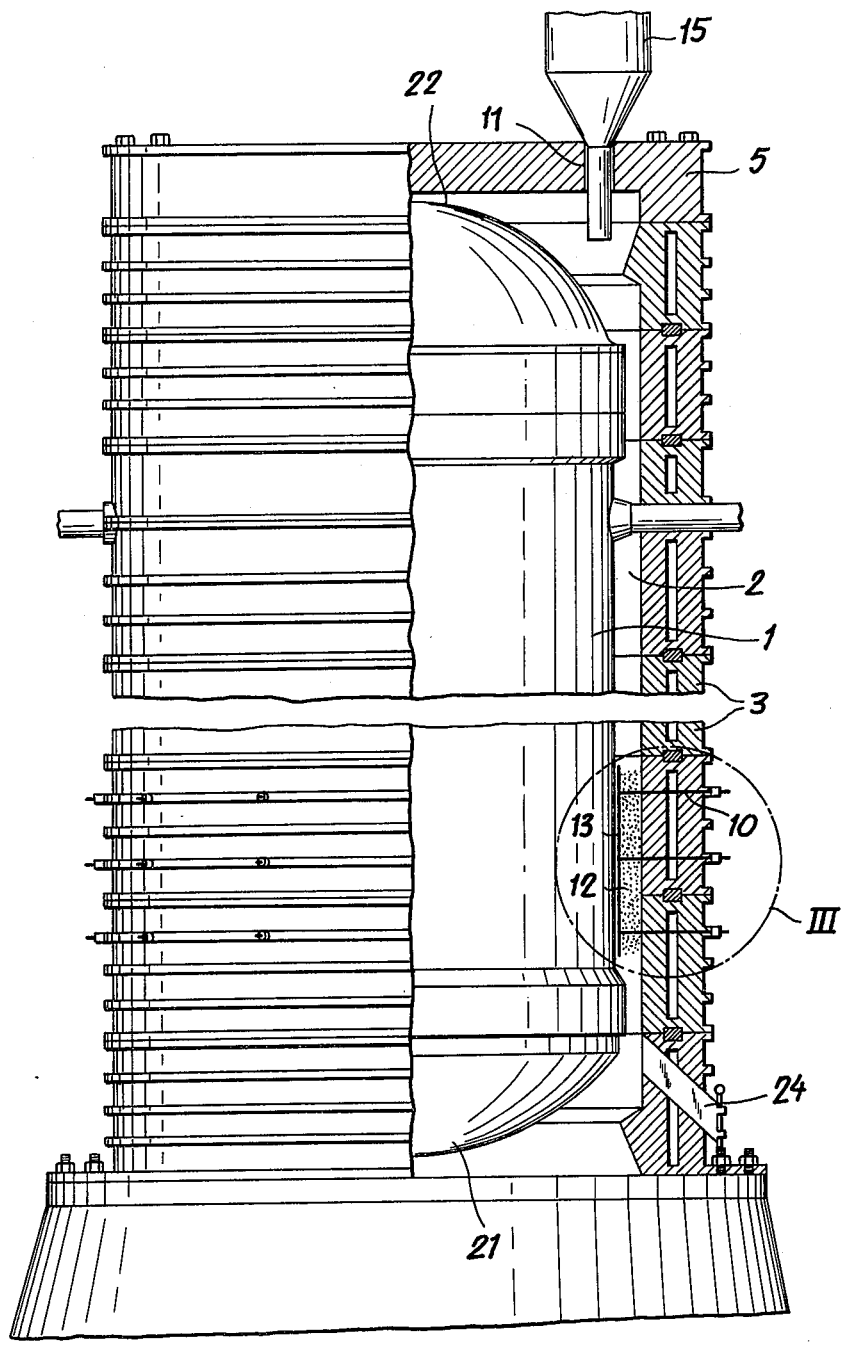
FIG. 2 is a vertical section similar to FIG. 1, but having a different zero-path filling.

FIG. 2 shows the same features as FIG. 1 but with the liquid 7 in FIG. 1 substituted by loose material 12, said loose material is held by steel plate aprons 13, which are attached to bolts 10. FIG. 3 shows in detail the preferably steel plate aprons 13 welded to form a vertical containment connected to bolts 10 which are supported in the side wall 3 of the burst shield in a fashion that allows screwing both ways. FIG. 4 shows steel plate aprons 13 arranged with overlaps 14.

In operation, the nuclear reactor core 1 may be in a cold state upon the introduction of water 7 into the inspection space 2 between the core and the burst shield 3. The seal 8 prevents escape of the liquid from the burst shield although the burst shield 3 consists of a multiplicity of stacked cast iron cylindrical rings as described in the above mentioned copending application.

The bottom 4 and cover 5 of the burst shield are constituted as described in the aforementioned application as well and the spaces above and below the reactor core are preferably filled with the incompressible medium as well. The bottom and cover 5 are stressed by hydraulic devices 20 against the pressure-vessel bottom 21 and the pressure dome 22 of the reactor vessel.

A suction pump 23 is provided to generate a slight subatmospheric pressure in the chamber 2 above the liquid 1, as the nuclear reactor expands as its temperature rises to the operating temperature, permits the liquid to completely fill the chamber barring any free burst path. Of course the liquid applies relatively little stress in the system shown in FIG. 1.

The operation of the systems of FIGS. 2 – 4 is somewhat different in that, while the nuclear reactor is in a cold state, the partition formed by the overlapping plates 13 is set back from the reactor wall by a distance at least sufficient to allow thermal expansion of the reactor. The filling 12 of particulate material is introduced by the hopper 15 through the inlet 11 at the top of the chamber 2 and fills the space between the partition and the burst shield 3. After the reactor has been brought to operating temperature, the partition is moved to contact the wall of the reactor so that the particulate material totally fills the space and there is no free path between reactor and shield. An outlet 24 enables the sand or other filler to be emptied from the system or use can be made of the suction device 9a, previously described.

We claim:

1. A method of operating a nuclear reactor having a nuclear reactor core spacedly surrounded by a burst shield consisting of a multiplicity of stacked cast iron cylinder sections, comprising the step of:
   filling the space between said core and said burst shield with an incompressible fluent medium in the form of a flowable particulate solid to eliminate any free burst path between said core and said shield and to distribute burst forces uniformly to said shield;
   removing said fluent medium for inspection of said space, said space being filled with said flowable particulate solid by the steps of:
      forming a partition in said space set outwardly from said core by a distance at least sufficient to enable thermal expansion of said core as it is brought to operating temperature;
      introducing said particulate solid between said partition and said shield in a relatively cool state of said reactor core;
      bringing said reactor core to operating temperature; and
      thereafter displacing said partition into contact with said core and thereby eliminating any free burst path between said core and said shield.

2. The method defined in claim 1 wherein said fluent medium is removed by draining it from the bottom of said space.

3. The method defined in claim 1 wherein said fluent medium is removed by suction through a tube introduced into said space from the top thereof.

4. In a nuclear reactor, in combination:
   a pressurized nuclear reactor core;
   a burst shield spacedly surrounding said core and defining therewith an inspection chamber;
   a body of a substantially incompressible fluent medium sealed in the form of a flowable particulate solid in said chamber and completely filling same to exclude any free burst path between said core and said shield;
   means for removing said fluent medium from said chamber to enable inspection thereof;
   a plurality of movable aprons disposed in said chamber and collectively forming a partition with adjustable spacing from said core, said particulate solid being disposed between said partition and said burst shield and means operable externally of said burst shield for moving said aprons.

5. The combination defined in claim 4 wherein said burst shield has an outlet at the bottom thereof for removing said fluent medium.

6. The combination defined in claim 4 further comprising a storage container disposed above said burst shield for feeding said fluent medium to said chamber.

7. The combination defined in claim 4 further comprising a suction device adapted to reach into said chamber to draw said fluent medium therefrom.

8. The combination defined in claim 4 wherein said burst shield comprising a stack of cylindrical cast iron sections.

* * * * *